(12) United States Patent
Aburatani

(10) Patent No.: US 12,339,188 B2
(45) Date of Patent: Jun. 24, 2025

(54) INFORMATION PROCESSING DEVICE

(71) Applicant: VALQUA, LTD., Tokyo (JP)

(72) Inventor: Yasushi Aburatani, Gojo (JP)

(73) Assignee: VALQUA, LTD., Tokyo (JP)

( * ) Notice: Subject to any disclaimer, the term of this patent is extended or adjusted under 35 U.S.C. 154(b) by 316 days.

(21) Appl. No.: 18/026,215

(22) PCT Filed: Sep. 13, 2021

(86) PCT No.: PCT/JP2021/033495
§ 371 (c)(1),
(2) Date: Mar. 14, 2023

(87) PCT Pub. No.: WO2022/059637
PCT Pub. Date: Mar. 24, 2022

(65) Prior Publication Data
US 2023/0332968 A1    Oct. 19, 2023

(30) Foreign Application Priority Data

Sep. 18, 2020   (JP) ................................ 2020-157389

(51) Int. Cl.
*G01L 5/24* (2006.01)
*G06T 7/00* (2017.01)
*G06T 7/90* (2017.01)

(52) U.S. Cl.
CPC ............. *G01L 5/24* (2013.01); *G06T 7/001* (2013.01); *G06T 7/90* (2017.01)

(58) Field of Classification Search
CPC . G01L 5/24; G06T 7/001; G06T 7/90; G01M 3/143
See application file for complete search history.

(56) References Cited

U.S. PATENT DOCUMENTS 9,897,501 B2 *    2/2018   Futai ...................... G09B 19/24
12,148,141 B2 *  11/2024   Aburatani ............... F16J 15/00
(Continued)

FOREIGN PATENT DOCUMENTS

| JP | S63158625 U | 10/1988 |
| JP | 2007040866 A | 2/2007 |

(Continued)

OTHER PUBLICATIONS

International Search Report and Written Opinion from corresponding International Application No. PCT/JP2021/033495 dated Nov. 9, 2021.

*Primary Examiner* — Freddie Kirkland, III
(74) *Attorney, Agent, or Firm* — Lando & Anastasi, LLP

(57) ABSTRACT

An information processing device includes a first evaluation unit that determines a type of a target seal material based on a color value of the target seal material and a color value of each of a plurality of candidate seal materials, a second evaluation unit that evaluates, based on a taken image of a flange before being fastened using the target seal material, a state of the flange being fastened, a third evaluation unit that evaluates a fastening state of a pair of the flanges with the target seal material interposed between the flanges based on a predetermined condition regarding fastening of the flange, and an output control unit that outputs advice information on the fastening of the flange using the target seal material based on respective evaluation results of the first to third evaluation units.

9 Claims, 13 Drawing Sheets

(56) References Cited

U.S. PATENT DOCUMENTS

| | | | |
|---|---|---|---|
| 2018/0321192 A1* | 11/2018 | Gardner | G01N 29/043 |
| 2021/0104033 A1* | 4/2021 | Imagawa | G06T 7/74 |
| 2022/0343489 A1* | 10/2022 | Aburatani | G06T 7/0004 |
| 2023/0115811 A1* | 4/2023 | Aburatani | G01N 21/8851 702/34 |

FOREIGN PATENT DOCUMENTS

| | | | |
|---|---|---|---|
| JP | 2012173097 A | 9/2012 | |
| JP | 2017110926 A | 6/2017 | |
| JP | 2017161388 A | 9/2017 | |
| WO | 2018003438 A1 | 1/2018 | |

* cited by examiner

FIG.3
(a)
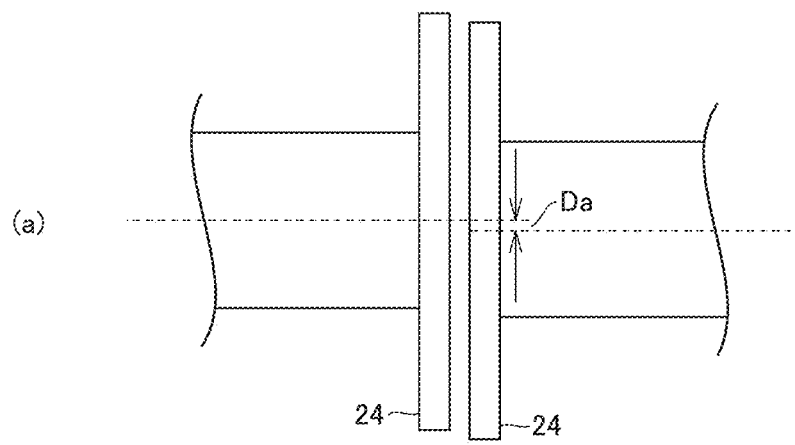
(b)
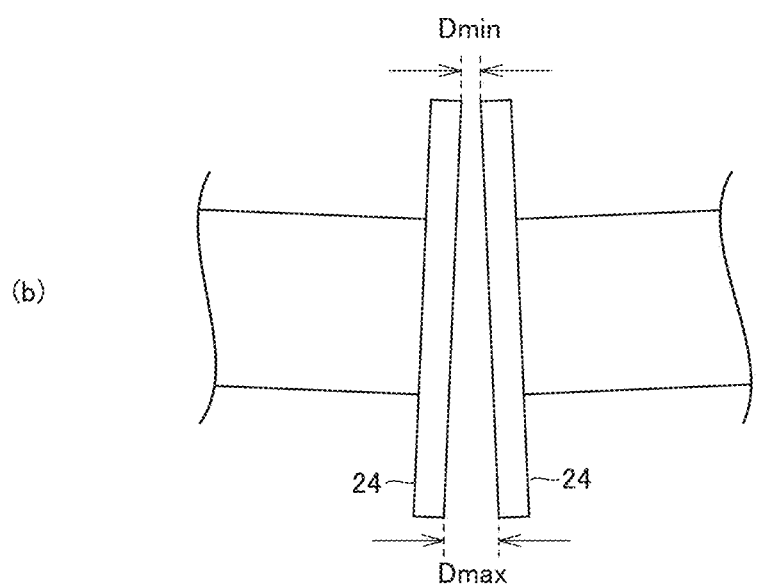

FIG.6

| EVALUATION TARGET | | INDEX | INDIVIDUAL EVALUATION CRITERIA |
|---|---|---|---|
| SEAL MATERIAL | A1 | TYPE | 3: DEGREE OF COINCIDENCE GREATER THAN OR EQUAL TO 70% |
| | | | 2: DEGREE OF COINCIDENCE GREATER THAN OR EQUAL TO 10% AND LESS THAN 70% |
| | | | 1: DEGREE OF COINCIDENCE LESS THAN 10% |
| | B1 | USE ENVIRONMENT | 3: COINCIDE WITH RECOMMENDED USE ENVIRONMENT |
| | | | 1: NOT COINCIDE WITH RECOMMENDED USE ENVIRONMENT |
| FLANGE | A2 | ADHERING MATTER | 3: AREA RATIO LESS THAN 10% |
| | | | 2: AREA RATIO GREATER THAN OR EQUAL TO 10% AND LESS THAN 50% |
| | | | 1: AREA RATIO GREATER THAN OR EQUAL TO 50% |
| | B2 | FLATNESS | 3: LESS THAN 1/250 mm |
| | | | 2: GREATER THAN OR EQUAL TO 1/250 mm AND LESS THAN 1/150 mm |
| | | | 1: GREATER THAN OR EQUAL TO 1/150 mm |
| FASTENING STATE | A3 | AXIAL FORCE | 3: FALLS WITHIN ±5% OF RECOMMENDED AXIAL FORCE |
| | | | 2: GREATER THAN OR EQUAL TO ±5% OF RECOMMENDED AXIAL FORCE |
| | | | 1: LESS THAN REQUIRED AXIAL FORCE OR GREATER THAN OR EQUAL TO MAXIMUM AXIAL FORCE |
| | B3 | SEATING STRESS | 3: FALLS WITHIN ±5% OF RECOMMENDED SEATING STRESS |
| | | | 2: GREATER THAN OR EQUAL TO ±5% OF RECOMMENDED SEATING STRESS OR GREATER THAN OR EQUAL TO MAXIMUM SEATING STRESS |
| | | | 1: LESS THAN MINIMUM SEATING STRESS |
| | C3 | AXIAL DIFFERENCE/ PERPENDICULARITY | 3: AXIAL DIFFERENCE LESS THAN 1.5 mm AND PERPENDICULARITY LESS THAN 0.8 mm |
| | | | 2: AXIAL DIFFERENCE GREATER THAN OR EQUAL TO 1.5 mm OR PERPENDICULARITY GREATER THAN OR EQUAL TO 0.8 mm |
| | | | 1: AXIAL DIFFERENCE GREATER THAN OR EQUAL TO 1.5 mm AND PERPENDICULARITY GREATER THAN OR EQUAL TO 0.8 mm |

SEAL MATERIAL — 710

| COMBINATION OF A1 AND B1 | | FINAL EVALUATION |
|---|---|---|
| 3 | 3 | 3 |
| 3 | 2 | 2 |
| 3 | 1 | 1 |
| 2 | 1 | 1 |
| 1 | 1 | 1 |

(b)

FLANGE — 720

| COMBINATION OF A2 AND B2 | | FINAL EVALUATION |
|---|---|---|
| 3 | 3 | 3 |
| 3 | 2 | 2 |
| 3 | 1 | 1 |
| 2 | 2 | 2 |
| 2 | 1 | 1 |
| 1 | 1 | 1 |

(c)

FASTENING STATE — 730

| COMBINATION OF A3, B3, AND C3 | | | FINAL EVALUATION |
|---|---|---|---|
| 3 | 3 | 3 | 3 |
| 3 | 3 | 2 | 2 |
| 3 | 3 | 1 | 1 |
| 3 | 2 | 2 | 2 |
| 3 | 2 | 1 | 1 |
| 2 | 2 | 2 | 2 |
| 2 | 2 | 1 | 1 |
| 2 | 1 | 1 | 1 |
| 1 | 1 | 1 | 1 |

|  | #600 | #700 | #300 |
|---|---|---|---|
| #600 | 0.0 | 4.1 | 13.9 |
| #700 | 4.1 | 0.0 | 17.7 |
| #300 | 13.9 | 17.7 | 0.0 |

310

(b)

|  | MINIMUM VALUE | MAXIMUM VALUE |
|---|---|---|
| #600 | 0.0 | 1.4 |
| #700 | 0.0 | 0.8 |
| #300 | 0.0 | 1.1 |

320

(c)

|  | TARGET OBJECT | #600 | #700 | #300 |
|---|---|---|---|---|
| TARGET OBJECT | 0.0 | 4.2 | 2.2 | 18.2 |
| #600 | 4.2 | 0.0 | 4.1 | 13.9 |
| #700 | 2.2 | 4.1 | 0.0 | 17.7 |
| #300 | 18.2 | 13.9 | 17.7 | 0.0 |

330

FIG.11
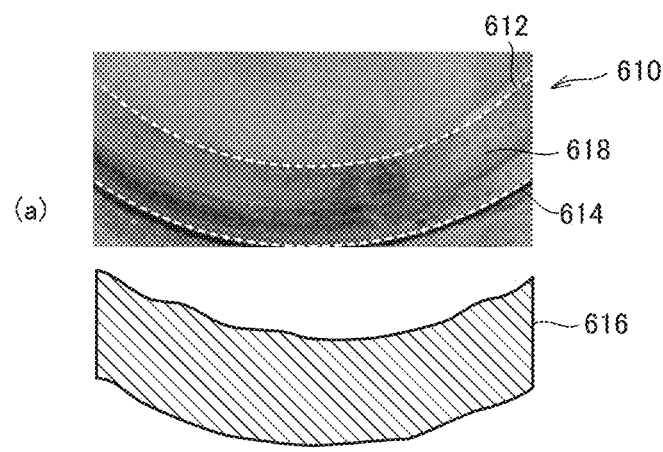
(a)
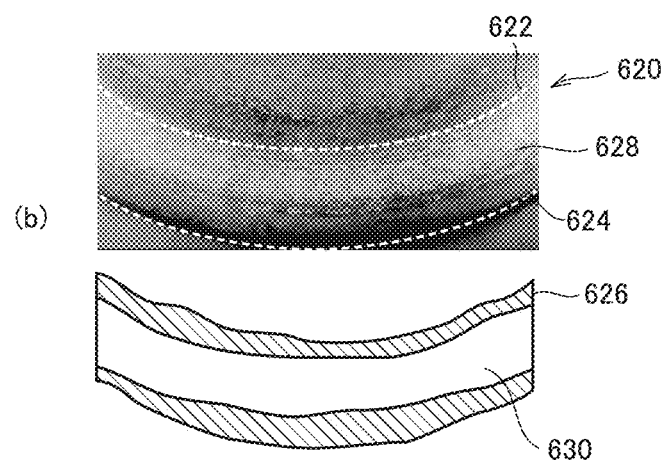
(b)

FIG.12

| | FINAL EVALUATION LEVEL | | | EVALUATION DETAILS | REMEDIAL MEASURE |
|---|---|---|---|---|---|
| | 1. SEAL MATERIAL | 2. FLANGE | 3. FASTENING STATE | | |
| R1 | 3 | 3 | 3 | MOST APPROPRIATE | — |
| R2 | 3 | 3 | 2 | APPROPRIATE: WITH ADDITIONAL INFORMATION | 3. FASTENING METHOD AND REFASTENING FREQUENCY |
| R3 | 3 | 2 | 3 | APPROPRIATE: WITH ADDITIONAL INFORMATION | 2. INSPECTION CORRECTION METHOD, REPLACEMENT FREQUENCY, AND RECOMMENDED MODEL NUMBER |
| R4 | 3 | 2 | 2 | FAIR: WITH RECOMMENDATION INFORMATION | 2. INSPECTION CORRECTION METHOD, REPLACEMENT FREQUENCY, AND RECOMMENDED MODEL NUMBER 3. FASTENING METHOD AND REFASTENING FREQUENCY |
| R5 | 3 | 3 | 1 | POOR: CHECK FASTENING STATE | — |
| R6 | 3 | 1 | 3 | POOR: CHECK STATE OF FLANGE | — |
| | 3 | 1 | 1 | POOR: CHECK STATE OF FLANGE AND FASTENING STATE | — |
| R8 | 2 | 3 | 3 | APPROPRIATE: WITH ADDITIONAL INFORMATION | 1. RECOMMENDED PRODUCT NUMBER AND PASTE APPLICATION METHOD |
| | 2 | 2 | 3 | FAIR: WITH RECOMMENDATION INFORMATION | 1. RECOMMENDED PRODUCT NUMBER AND PASTE APPLICATION METHOD 2. INSPECTION CORRECTION METHOD, REPLACEMENT FREQUENCY, AND RECOMMENDED MODEL NUMBER |
| | 2 | 3 | 2 | FAIR: WITH RECOMMENDATION INFORMATION | 1. RECOMMENDED PRODUCT NUMBER AND PASTE APPLICATION METHOD 2. DISPLAY OF FASTENING METHOD |
| R11 | 2 | 2 | 2 | FAIR: WITH RECOMMENDATION INFORMATION | 1. RECOMMENDED PRODUCT NUMBER AND PASTE APPLICATION METHOD 2. INSPECTION CORRECTION METHOD, REPLACEMENT FREQUENCY, AND RECOMMENDED MODEL NUMBER 3. FASTENING METHOD AND REFASTENING FREQUENCY |
| | 2 | 2 | 1 | POOR: CHECK FASTENING STATE | 1. RECOMMENDED PRODUCT NUMBER AND PASTE APPLICATION METHOD |
| | 2 | 1 | 2 | POOR: CHECK STATE OF FLANGE | 1. DISPLAY OF RECOMMENDED PRODUCT NUMBER AND PASTE APPLICATION METHOD |
| | 2 | 1 | 1 | POOR: CHECK STATE OF FLANGE AND FASTENING STATE | 1. DISPLAY OF RECOMMENDED PRODUCT NUMBER AND PASTE APPLICATION METHOD |
| R15 | 1 | 3 | 3 | NOT WORKABLE: CHECK SEAL MATERIAL | — |
| | 1 | 3 | 1 | NOT WORKABLE: CHECK SEAL MATERIAL | — |
| | 1 | 1 | 3 | NOT WORKABLE: CHECK SEAL MATERIAL | — |
| | 1 | 2 | 2 | NOT WORKABLE: CHECK SEAL MATERIAL | — |
| | 1 | 2 | 1 | NOT WORKABLE: CHECK SEAL MATERIAL | — |
| | 1 | 1 | 2 | NOT WORKABLE: CHECK SEAL MATERIAL | — |
| | 1 | 1 | 1 | NOT WORKABLE: CHECK SEAL MATERIAL | — |

INFORMATION PROCESSING DEVICE

CROSS-REFERENCE TO RELATED APPLICATIONS

This application is a U.S. National Stage Application under 35 U.S.C. § 371 of International Application No. PCT/JP2021/033495, filed Sep. 13, 2021, titled INFORMATION PROCESSING DEVICE, which claims priority to Japanese Application No. 2020-157389, filed Sep. 18, 2020. International Application No. PCT/JP2021/033495 is incorporated by reference herein in its entirety.

TECHNICAL FIELD

The present disclosure relates to an information processing device.

BACKGROUND ART

There has been a configuration where the remaining life of a seal material applied to a structure that is kept airtight or watertight is diagnosed on the basis of a compression set rate of the seal material. For example, Japanese Patent Laying-Open No. 2012-173097 (PTL 1) discloses a technique for diagnosing a seal material using the compression set rate of the seal material as an evaluation index based on the JIS standards even after a lapse of a measurement time defined by the JIS standards.

CITATION LIST

Patent Literature

PTL 1: Japanese Patent Laying-Open No. 2012-173097

SUMMARY OF INVENTION

Technical Problem

Technical knowledge and experience are required for handling trouble related to the seal material. For example, there are many cases where, in response to an inquiry about fastening of a flange using the seal material, a person with poor knowledge and experience cannot immediately grasp whether or not the state of the seal material or the flange is appropriate and asks a specific expert to check whether or not the state is appropriate. Therefore, when it is difficult to make a response due to the absence of the expert or the like, effective information on the fastening of the flange using the seal material cannot be quickly presented to a client.

It is therefore an object of an aspect of the present disclosure to provide an information processing device capable of quickly presenting effective information on fastening of a flange using a seal material.

Solution to Problem

An information processing device according to an embodiment includes a first evaluation unit that determines a type of a target seal material based on a color value of the target seal material and a color value of each of a plurality of candidate seal materials, a second evaluation unit that evaluates, based on a taken image of a flange before being fastened using the target seal material, a state of the flange before being fastened, a third evaluation unit that evaluates a fastening state of a pair of the flanges with the target seal material interposed between the flanges based on a predetermined condition regarding fastening of the flange, and an output control unit that outputs advice information on the fastening of the flange using the target seal material based on respective evaluation results of the first to third evaluation units.

Preferably, the first evaluation unit calculates, based on the color value of the target seal material and the color value of each of the plurality of candidate seal materials, a color difference between each of the candidate seal materials and the target seal material, and determines the type of the target seal material based on the color difference between each of the candidate seal materials and the target seal material.

Preferably, the first evaluation unit compares information indicating a use environment of the target seal material with information indicating a recommended use environment of a seal material of the determined type to evaluate whether or not the use environment of the target seal material is appropriate.

Preferably, the second evaluation unit calculates a ratio of an area occupied by an adhering matter adhering to the flange to an analysis region of the taken image and evaluates, in a case where the ratio is less than a first threshold, that the state of the flange is appropriate.

Preferably, the second evaluation unit calculates a ratio of an area occupied by an adhering matter adhering to the flange to an analysis region of the taken image and evaluates, in a case where the ratio is less than a first threshold and flatness of the flange is less than a second threshold, that the state of the flange is appropriate.

Preferably, the third evaluation unit evaluates, in a case where a parameter regarding the fastening state of the pair of flanges with the target seal material interposed between the flanges satisfies the predetermined condition, that the fastening state of the pair of flanges is appropriate.

Preferably, the parameter includes at least one of an axial force of a bolt with which the pair of flanges are fastened, a seating stress applied to the target seal material when the pair of flanges are fastened, an axial difference between the pair of flanges, or perpendicularity of the pair of flanges.

Preferably, the advice information includes an overall evaluation result based on the respective evaluation results of the first to third evaluation units, and information for prompting checking, for each of the first to third evaluation units, of an evaluation target of the evaluation unit in a case where the evaluation unit has made a negative evaluation.

Preferably, the advice information further includes information for improvement, for each of the first to third evaluation units, to change a negative evaluation to a positive evaluation in a case where the evaluation unit has made the negative evaluation.

Advantageous Effects of Invention

According to the present disclosure, it is possible to quickly present effective information on fastening of a flange using a sealing material.

BRIEF DESCRIPTION OF THE DRAWINGS

FIG. 3 is a schematic diagram for describing an axial difference and perpendicularity.

FIG. 6 is a table of individual evaluation criteria.

FIG. 7 is a table of final evaluation criteria.

FIG. 8 is a diagram showing examples of various databases regarding color differences.

FIG. 11 is a diagram for describing a method for calculating an area ratio.

FIG. 12 is a diagram showing output examples of advice information.

DESCRIPTION OF EMBODIMENTS

Figure 1:
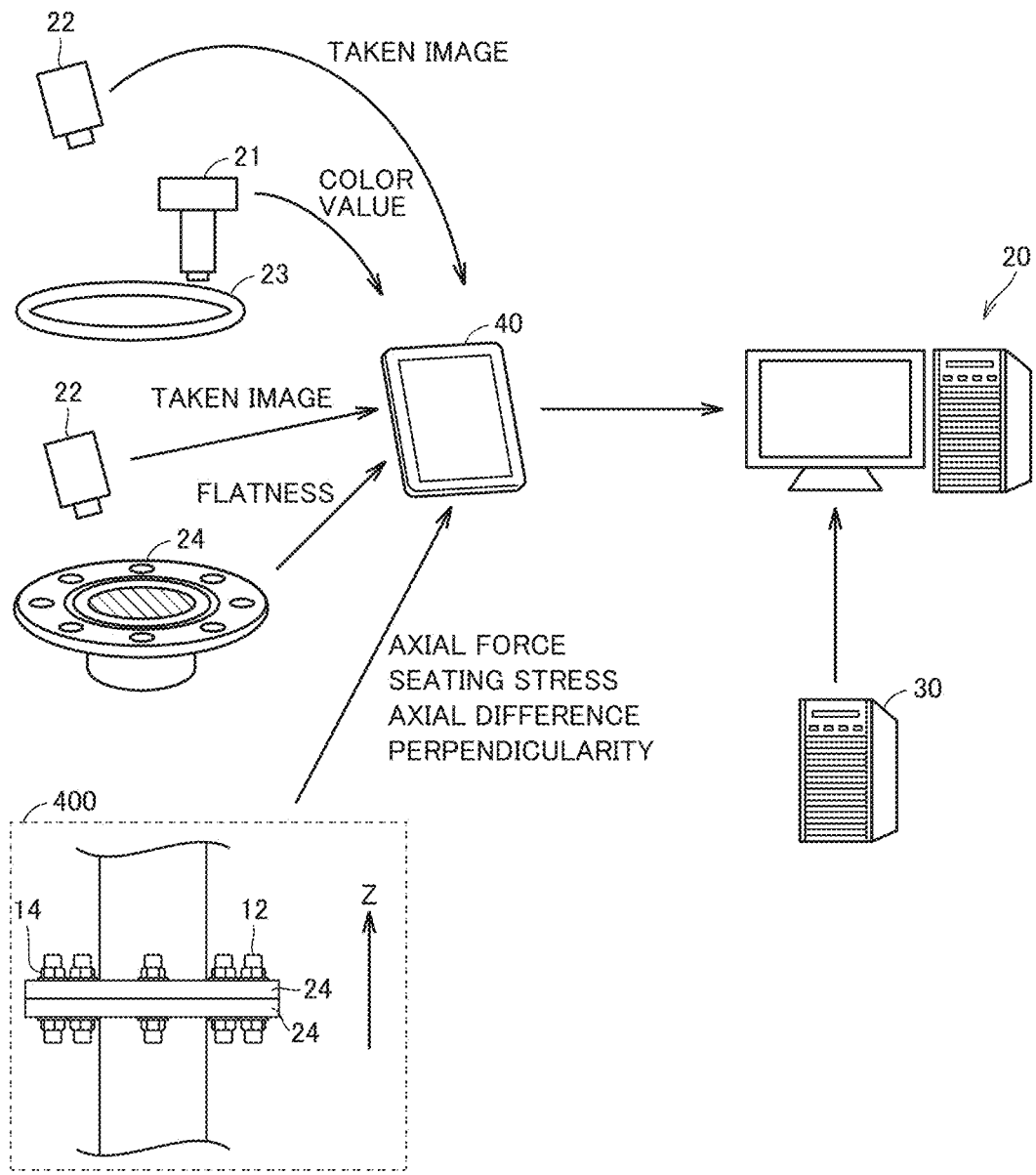
FIG. 1 is a diagram for describing an overall configuration of an information processing system.

With reference to the drawings, embodiments according to the present disclosure will be described below. In the following description, the same components are denoted by the same reference numerals. Names and functions of such components are also the same. Therefore, no redundant detailed description will be given of such components.

<System Configuration>

FIG. 1 is a diagram for describing an overall configuration of an information processing system 1000. With reference to FIG. 1, information processing system 1000 is a system for outputting advice information on fastening of a flange 24 using a seal material 23. Information processing system 1000 includes an information processing device 20, a server 30, and a terminal device 40. Note that, in the present embodiment, it is assumed that a worker who is a user of terminal device 40 replaces a used seal material used for fastening flange 24 with a new seal material 23 before use. Seal material 23 thus used is adapted to the standard of flange 24 is used. The worker performs various measurements in order to appropriately fasten the pair of flanges 24 using seal material 23 and imports the measurement information into terminal device 40. Terminal device 40 transmits the measurement information thus imported to information processing device 20. Information processing device 20 transmits, to terminal device 40, advice information based on the measurement information thus received.

Seal material 23 is sandwiched between the pair of flanges 24 and fixed as a result of fastening flanges 24 with a bolt so as to prevent a fluid from leaking from a gap between flanges 24. It is assumed that seal material 23 is either a static seal material called a gasket or a dynamic seal material called packing. In the following description, it is assumed that seal material 23 is a gasket for the sake of simplicity. The gasket is a seal material capable of sealing a gap in a portion where the gasket is installed to make the portion airtight. There are various types of gaskets, and the gasket is appropriately selected in accordance with how a pipe is used.

Terminal device 40 is capable of communicating with information processing device 20. Terminal device 40 acquires the measurement information on seal material 23 and flange 24 and transmits the measurement information to information processing device 20. Terminal device 40 receives the advice information on the fastening of flange 24 using seal material 23 from information processing device 20 as a response to the measurement information. Terminal device 40 is typically, but is not limited to, a smartphone, and may be, for example, a tablet terminal device. Note that terminal device 40 may be capable of communicating with information processing device 20.

Terminal device 40 acquires color information on seal material 23, a taken image seal material 23, and information indicating a use environment of seal material 23 (hereinafter, also referred to as "use environment information") as the measurement information on seal material 23. Specifically, terminal device 40 acquires the color information on seal material 23 from a color difference meter 21. Color difference meter 21 measures the color information on seal material 23 and transmits the color information thus measured to terminal device 40. The color information is, for example, a color value in a color space, and is herein a value in the L*a*b* color space (hereinafter, referred to as a "Lab value").

Terminal device 40 acquires the taken image of seal material 23 from a camera 22. As an example, camera 22 includes an imaging element partitioned into a plurality of pixels, such as a coupled charged device (CCD) or a complementary metal oxide semiconductor (CMOS) sensor, in addition to an optical system such as a lens. The taken image taken by camera 22 is transmitted to terminal device 40. Note that a lighting device (such as an LED, a fluorescent lamp, an incandescent lamp, or the like) that irradiates seal material 23 with light may be separately provided.

Terminal device 40 receives the use environment information on seal material 23 from the worker. The use environment information includes a fluid to be sealed in by seal material 23 (use fluid), a temperature at which seal material 23 is used (use temperature), and a pressure under which seal material 23 is used (use pressure).

Terminal device 40 acquires a taken image of a seal surface (flange seal surface) of flange 24 and flatness of flange 24 as the measurement information on flange 24. The taken image of the seal surface of flange 24 is acquired by camera 22, for example.

Figure 2:
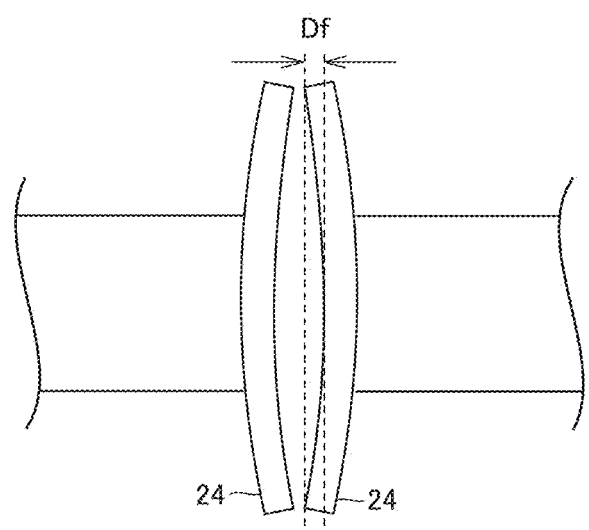
FIG. 2 is a schematic diagram for describing flatness.

FIG. 2 is a schematic diagram for describing flatness. With reference to FIG. 2, flatness Df of flange 24 indicates a degree of warpage of the seal surface of flange 24. Flatness Df is represented by, for example, a value of a gap generated when the seal surface of flange 24 is sandwiched between parallel planes. Flatness Df is measured by a predetermined method using a predetermined measuring instrument. The worker inputs flatness Df thus measured into terminal device 40.

With reference again to FIG. 1, terminal device 40 acquires the measurement information on a fastening state where the pair of flanges 24 are fastened with seal material 23 interposed between flanges 24. The measurement information includes a tightening force (axial force) generated when the bolt is rotated to fasten flanges 24, a force (tightening torque) in the rotation direction when the bolt is rotated to fasten, a seating stress applied to seal material 23, an axial difference between the pair of flanges 24, perpendicularity of the pair of flanges 24, and the like. Either the axial force or the tightening torque only needs to be acquired, so that it is assumed that the axial force is acquired in the present embodiment. The axial force (tightening torque), the seating stress, the axial difference, and the perpendicularity are measured by the predetermined measuring instrument under the predetermined method.

An image 400 indicates a state where the pair of flanges 24 are fastened with seal material 23 interposed between flanges 24. Each flange 24 is provided with a plurality of bolts 12. A nut 14 is attached to each bolt 12. It is possible to apply a uniform tightening force to seal material 23 by tightening nut 14. When a tightening torque is applied with a tightening tool in contact with nut 14, an axial force (tightening force) is generated in each bolt 12 in a Z-axis direction in FIG. 1. When the tightening torque is denoted as T, the axial force is denoted as F, a torque coefficient is denoted as k, and a screw nominal diameter is denoted as d, $T=kdF$ holds. In the present embodiment, it is assumed that the worker measures the axial force as the measurement information on the fastening state.

Further, the worker measures the seating stress applied to seal material 23 when the pair of flanges 24 are fastened as indicated by image 400. The seating stress is a tightening pressure in the Z-axis direction in FIG. 1 applied to seal material 23 by a pressing force generated by the pair of flanges 24.

FIG. 3 is a schematic diagram for describing an axial difference and perpendicularity. With reference to FIG. 3(*a*), an axial difference Da between flanges 24 is a difference between a center axis (center line) of one flange 24 and a center axis of the other flange 24. With reference to FIG. 3(*b*), perpendicularity is a difference between a maximum gap Dmax between one flange 24 and the other flange 24 and a minimum gap Dmin between one flange 24 and the other flange 24 (that is, perpendicularity=Dmax−Dmin). The worker measures the axial difference and the perpendicularity.

With reference again to FIG. 1, information processing device 20 typically has a structure based on a general-purpose computer architecture, and causes a processor to execute a program installed in advance to perform various types of processing to be described later. Information processing device 20 is, for example, a desktop personal computer (PC). Note that information processing device 20 only needs to be a device capable of performing functions and processing to be described below, and may be a different device (such as a laptop PC or a tablet terminal device).

In the present embodiment, information processing device 20 evaluates the use environment of seal material 23, the state of flange 24, and the fastening state of the pair of flange 24 based on various pieces of measurement information received from terminal device 40, and outputs the evaluation result and advice information based on the evaluation.

Server 30 is capable of communicating with information processing device 20. Server 30 stores various types of data used for processing of information processing device 20.

Figure 4:
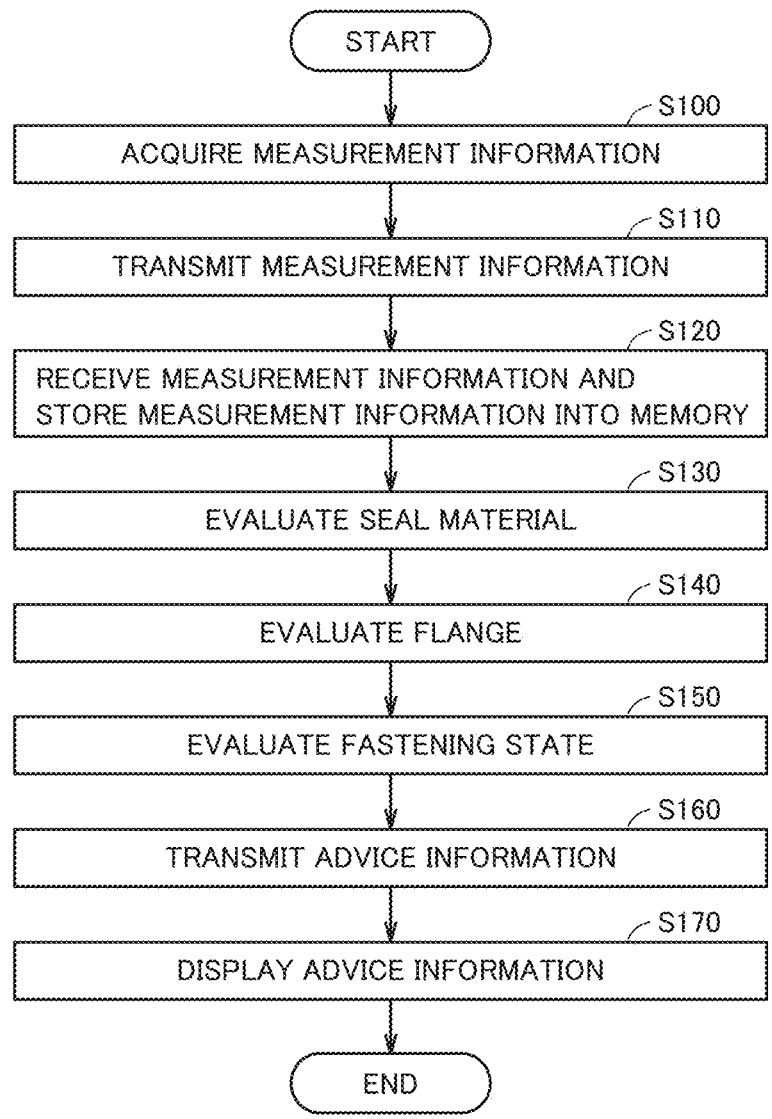
FIG. 4 is a flowchart of an example of an operation outline of the information processing system.

FIG. 4 is a flowchart of an example of an operation outline of the information processing system. With reference to FIG. 4, terminal device 40 acquires various pieces of measurement information (step S100). Specifically, terminal device 40 acquires color information on seal material 23 and a taken image of seal material 23, a taken image and flatness of flanges 24, and measurement information (axial force, seating stress, axial difference, perpendicularity) regarding a fastening state. Terminal device 40 transmits the various pieces of measurement information to information processing device 20 (step S110).

Information processing device 20 receives the various pieces of measurement information from terminal device 40 and stores the various pieces of measurement information into an internal memory (step S120). Information processing device 20 evaluates a use state of seal material 23 based on the measurement information on seal material 23 (step S130). Specifically, information processing device 20 determines a type (for example, a product number) of seal material 23 from the color value (and the taken image) of seal material 23, and evaluates the use environment of seal material 23 based on a recommended use environment of a seal material of the type.

Information processing device 20 evaluates the state of flange 24 based on the measurement information on flange 24 (step S140). Specifically, information processing device 20 evaluates whether or not an adhering matter exists using the taken image of the seal surface of flange 24 or evaluates whether or not the flatness of flange 24 satisfies a predetermined criterion.

Information processing device 20 evaluates whether or not the pair of flanges 24 are appropriately fastened with seal material 23 interposed between flanges 24 based on the measurement information on the fastening state (step S150). Specifically, information processing device 20 evaluates whether or not the measured axial force, seating stress, axial difference, and perpendicularity satisfy their respective predetermined criteria.

Information processing device 20 creates advice information based on results of the evaluations performed in steps S130 to S150 and transmits the advice information to terminal device 40 (step S160). Terminal device 40 displays the advice information thus received on a display (step S170). Note that information processing device 20 may transmit, to server 30, the results of the evaluations performed in steps S130 to S150 and the advice information.

Information processing device 20 creates the advice information on the fastening of the pair of flanges 24 with seal material 23 interposed between flanges 24 using the various pieces of measurement information on seal material 23, flange 24, and the fastening state. Therefore, even a person who is not an expert can quickly grasp whether or not the fastening is appropriate, and can efficiently handle trouble related to the fastening.

<Hardware Configuration>
(Information Processing Device)

Figure 5:
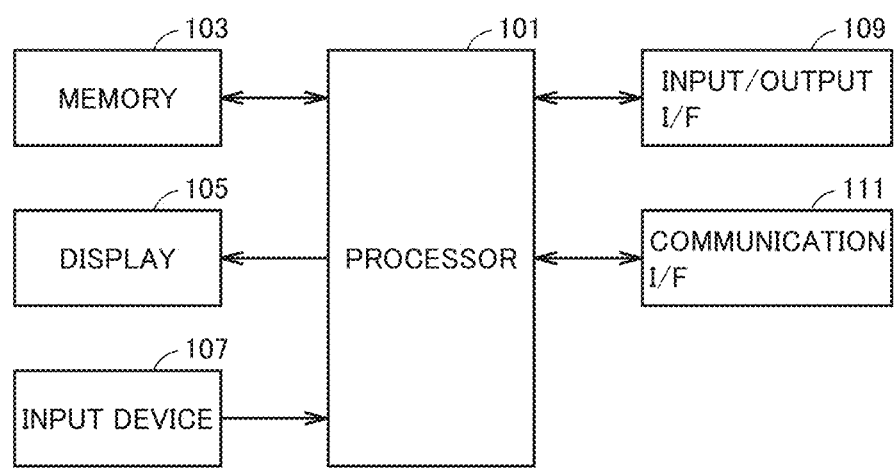
FIG. 5 is a block diagram illustrating an example of a hardware configuration of an information processing device.

FIG. 5 is a block diagram illustrating an example of a hardware configuration of information processing device 20. With reference to FIG. 5, information processing device 20 includes a processor 101, a memory 103, a display 105, an input device 107, an input/output interface (I/F) 109, and a communication interface (I/F) 111. Such units are data-communicatively interconnected.

Processor 101 is typically an arithmetic processing unit such as a central processing unit (CPU) or a multi processing unit (MPU). Processor 101 reads and executes a program stored in memory 103 to control the operation of each unit of information processing device 20. More specifically, processor 101 executes the program to perform each function of information processing device 20.

Memory 103 is implemented by a random access memory (RAM), a read-only memory (ROM), a flash memory, a hard disk, or the like. Memory 103 stores the program to be executed by processor 101, the above-described measurement information, and the like.

Display 105 is, for example, a liquid crystal display, an organic electro luminescence (EL) display, or the like. Display 105 may be inseparable from information processing device 20 or may be provided separately from information processing device 20.

Input device 107 receives an operation input directed to information processing device 20. Input device 107 is implemented by, for example, a keyboard, a button, a mouse, or the like. Further, input device 107 may be implemented as a touchscreen.

Input/output interface 109 is used for data transmission between processor 101, and color difference meter 21 and camera 22. Input/output interface 109 is connectable with, for example, color difference meter 21 and camera 22. Processor 101 acquires the color value measured by color difference meter 21 and the taken image taken by camera 22 via input/output interface 109.

Communication interface 111 is used for data transmission between processor 101 and server 30 or the like. As the communication system, for example, a radio communication system such as Bluetooth (registered trademark) or a wireless local area network (LAN) is used. Note that as the communication system, a wired communication system such as universal serial bus (USB) may be used. Note that processor 101 may communicate with color difference meter 21 and camera 22 via communication interface 111.

(Server)

A known hardware configuration may be applied to server 30. For example, server 30 includes a processor for executing various types of processing, a memory for storing a program, data, and the like, a communication interface for transmitting and receiving various types of data to and from information processing device 20, and an input device for receiving an instruction from a user.

(Terminal Device)

Terminal device 40 only needs to be able to provide information processing as described later as a whole, and a known hardware configuration may be applied to the hardware configuration of terminal device 40. For example, terminal device 40 includes a processor, a memory, a communication interface for transmitting and receiving various types of data to and from information processing device 20, a touchscreen for receiving an instruction from the user, and a display for displaying various types of information.

<Evaluation Method>

Respective evaluation methods of seal material 23, flange 24, and the fastening state will be described in detail.

(Evaluation Criteria)

With reference to FIGS. 6 and 7, evaluation criteria will be described. FIG. 6 is a diagram showing a table of individual evaluation criteria. FIG. 7 is a diagram showing a table of final evaluation criteria. FIG. 7(a) shows a table of final evaluation criteria for seal material 23. FIG. 7(b) shows a table of final evaluation criteria for flange 24. FIG. 7(c) shows a table of final evaluation criteria for the fastening state of the pair of flanges 24 with seal material 23 interposed between flanges 24.

With reference to FIG. 6, a table 510 includes "evaluation target", "index", and "individual evaluation criteria" as items. Specifically, table 510 shows individual evaluation criteria for the evaluation target on an index-by-index basis. Information processing device 20 evaluates each evaluation target on an index-by-index basis in accordance with the individual evaluation criteria in table 510. An evaluation level "3" of the individual evaluation criteria indicates the highest rating (for example, recommended criteria are satisfied). An evaluation level "1" indicates the lowest rating (for example, even minimum criteria are not satisfied). An evaluation level "2" is an intermediate evaluation level (for example, the recommended criteria are not satisfied, but the minimum criteria are satisfied) between the evaluation level "3" and the evaluation level "1".

Information processing device 20 evaluates an evaluation target "seal material" based on an index A1 "type" and an index B1 "use environment". Index A1 "type" is evaluated on a three-level scale based on a degree of coincidence between seal material 23 and various types of seal materials prepared in advance. A method for calculating the degree of coincidence will be described later. In a case where the degree of coincidence is greater than or equal to 70%, the evaluation level is "3", indicating that the type of seal material 23 is determined with high accuracy. In a case where the degree of coincidence is greater than or equal to 10% and less than 70%, the evaluation level is "2", indicating that the type of seal material 23 is determined with minimum allowable accuracy. In a case where the degree of coincidence is less than 10%, the evaluation level is "1", indicating that the type of seal material 23 cannot be determined. Note that, in this case, there is a possibility that seal material 23 has deteriorated and discolored, or seal material 23 is not adapted to the standard of flange 24 in the first place.

Index B1 "use environment" is evaluated on a two-level scale based on "recommended use environment" associated with the type of seal material 23 determined based on index A1 "type". In a case where the use environment of seal material 23 coincides with the recommended use environment, the evaluation level is "3", and in a case where the use environment does not coincide with the recommended use environment, the evaluation level is "1".

Information processing device 20 determines the final evaluation level of the evaluation target "seal material" based on the evaluation level of index A1 "type" and the evaluation level of index B1 "use environment".

With reference to FIG. 7(a), a table 710 shows final evaluation levels of seal material 23 each associated with a corresponding combination of the evaluation level of index A1 and the evaluation level of index B1. A final evaluation level "3" indicates the highest rating, and a final evaluation level "1" indicates that the lowest rating. A final evaluation level "2" is an intermediate evaluation level between the evaluation level "3" and the evaluation level "1". The same applies to a table 720 of FIG. 7(b) and a table 730 of FIG. 7(c). Note that, in the following description, a combination of an evaluation level "x1" and an evaluation level "x2" is referred to as an evaluation level (x1, x2). For example, in a case where both the evaluation levels of indexes A1, B1 are "3", the combination of the evaluation levels of indexes A1, B1 is expressed as an evaluation level (3, 3).

Only in a case where the combination of the evaluation levels of indexes A1, B1 is an evaluation level (3, 3), the final evaluation level of seal material 23 is "3". In this case, the type of seal material 23 is determined with high accuracy, and the use environment of seal material 23 also coincides with the recommended use environment. It is therefore evaluated that there is no problem in the use state of seal material 23 (that is, seal material 23 is appropriately used).

Only in a case where the combination of the evaluation levels of indexes A1, B1 is an evaluation level (3, 2), the final evaluation level of seal material 23 is "2". There is no evaluation level "2" of index B 1, so that this combination is a combination in which the evaluation level of index B1 is "3" and the evaluation level of index A1 is "2". In this case, the use environment associated with the type of seal material 23 is appropriate, but a possibility that the type is not determined with high accuracy, that is, the type is erroneously determined, cannot be denied. It is therefore evaluated that there is substantially no problem in the use state of seal material 23.

In a case where the combination of the evaluation levels of indexes A1, B1 is any one of evaluation levels (3, 1), (2, 1), (1, 1), the final evaluation level of seal material 23 is "1". In this case, the type of seal material 23 cannot be determined, or the use environment of seal material 23 is not the recommended use environment. It is therefore evaluated that the use state of seal material 23 is inappropriate.

With reference again to FIG. 6, information processing device 20 evaluates an evaluation target "flange" based on an index A2 "adhering matter" and an index B2 "flatness".

Index A2 "adhering matter" is evaluated on a three-level scale based on a ratio of an area of an adhering matter to an area of a predetermined region on the seal surface of flange 24 (hereinafter, also referred to as an "area ratio"). A method for calculating the area ratio will be described later. In a case where the "area ratio" is less than 10%, the evaluation level is "3", indicating that almost no adhering matter exists on the seal surface of flange 24. In a case where the "area ratio" is greater than or equal to 10% and less than 50%, the evaluation level is "2", indicating that a relatively large amount of adhering matter exists on the seal surface of flange 24. In a case where the "area ratio" is greater than or equal to 50%, the evaluation level is "1", indicating that an extremely large amount of adhering matter exists on the seal surface of flange 24.

Index B2 "flatness" is evaluated on a three-level scale. In a case where the flatness is less than 1/250 mm, the evaluation level is "3". In this case, the flatness satisfies the recommended criteria. In a case where the flatness is greater than or equal to 1/250 mm and less than 1/150 mm, the evaluation level is "2". In this case, the flatness does not satisfy the recommended criteria but satisfies minimum criteria (that is, minimum design criteria to be satisfied). In a case where the flatness is greater than or equal to 1/150, the evaluation level is "1". In this case, the flatness does not satisfy the minimum criteria.

With reference to FIG. 7(b), table 720 shows final evaluation levels of flange 24 each associated with a corresponding combination of the evaluation level of index A2 and the evaluation level of index B2.

Only in a case where the combination of the evaluation levels of indexes A2, B2 is an evaluation level (3, 3), the final evaluation level of flange 24 is "3". In this case, almost no adhering matter exists on the seal surface of flange 24, and the flatness of the seal surface satisfies the recommended criteria, so that it is evaluated that the state of flange 24 is appropriate enough.

In a case where the combination of the evaluation levels of index A2 and index B2 is either of evaluation levels (3, 2), (2, 2), the final evaluation level of flange 24 is "2". In this case, a relatively large amount of adhering matter exists on the seal surface of flange 24, or the flatness of the seal surface satisfies the minimum criteria. It is therefore evaluated that the state of flange 24 is roughly appropriate.

In a case where the combination of the evaluation levels of index A2 and index B2 is any one of evaluation levels (3, 1), (2, 1), (1, 1) the final evaluation level of flange 24 is "1". In this case, an extremely large amount of adhering matter exists on the seal surface of flange 24, or the seal surface does not satisfy the minimum criteria. It is therefore evaluated that the state of flange 24 is inappropriate.

With reference again to FIG. 6, information processing device 20 evaluates an evaluation target "fastening state" based on an index A3 "axial force", an index B3 "seating stress", and an index C3 "axial difference/perpendicularity".

Index A3 "axial force" is evaluated on a three-level scale based on a recommended axial force, a required axial force, and a maximum axial force. In a case where an axial force that has been measured (hereinafter, also referred to as a "measured axial force") falls within ±5% of the recommended axial force, the evaluation level is "3". In this case, it is evaluated that the measured axial force satisfies the recommended criteria. Further, in a case where the measured axial force is greater than or equal to ±5% of the recommended axial force, but is greater than or equal to the required axial force and less than the maximum axial force, the evaluation level is "2". In this case, it is evaluated that the measured axial force satisfies the minimum criteria. Further, in a case where the measured axial force is less than the required axial force or greater than or equal to the maximum axial force, the evaluation level is "1". In this case, it is evaluated that the measured axial force does not satisfy the minimum criteria.

Index B3 "seating stress" is evaluated on a three-level scale based on a recommended seating stress, a minimum seating stress, and a maximum seating stress. In a case where a seating stress that has been measured (hereinafter, also referred to as a "measured seating stress") falls within ±5% of the recommended seating stress, the evaluation level is "3". In this case, it is evaluated that the measured seating stress satisfies the recommended criteria. Further, in a case where the measured seating stress does not fall within ±5% of the recommended seating stress and is greater than or equal to the minimum seating stress and less than the maximum seating stress, the evaluation level is "2". In this case, it is evaluated that the measured seating stress satisfies the minimum criteria. Further, in a case where the measured seating stress is less than the minimum seating stress or greater than or equal to the maximum seating stress, the evaluation level is "1". In this case, it is evaluated that the measured seating stress does not satisfy the minimum criteria.

Index C3 "axial difference/perpendicularity" is evaluated on a three-level scale based on a reference axial difference, reference perpendicularity, a maximum axial difference, and maximum perpendicularity. In a case where an axial difference that has been measured (hereinafter, also referred to as a "measured axial difference") is less than the reference axial difference (for example, 1.5 mm) and perpendicularity that has been measured (hereinafter, also referred to as "measured perpendicularity") is less than the reference perpendicularity (for example, 0.8 mm), the evaluation level is "3". In this case, it is evaluated that the measured axial difference and the measured perpendicularity each satisfy corresponding recommended criteria, and the axial difference/perpendicularity satisfies the recommended criteria as a whole. In a case where the measured axial difference is greater than or equal to 1.5 mm or the measured perpendicularity is greater than or equal to 0.8 mm, the evaluation level is "2". In this case, it is evaluated that either the measured axial difference or the measured perpendicularity satisfies corresponding recommended criteria, the other does not satisfy corresponding recommended criteria, and the axial difference/perpendicularity satisfies the minimum criteria as a whole. Further, in a case where the measured axial difference is greater than or equal to 1.5 mm and the measured perpendicularity is greater than or equal to 0.8 mm, the evaluation level is "1". In this case, it is evaluated that neither the measured axial difference nor the measured perpendicularity satisfies their respective recommended criteria, and the axial difference/perpendicularity does not satisfy the minimum criteria as a whole.

With reference to FIG. 7(c), table 730 shows final evaluation levels of the fastening state each associated with a corresponding combination of the evaluation levels of index A3, index B3, and index C3.

Only in a case where the combination of the evaluation levels of indexes A3, B3, C3 is an evaluation level (3, 3, 3), the final evaluation level of the fastening state of the pair of flanges 24 with seal material 23 interposed between flanges 24 is "3". In this case, all of the axial force, the seating stress, and the axial difference/perpendicularity satisfy their respective recommended criteria, so that it is evaluated that the fastening state is appropriate enough.

In a case where the combination of the evaluation levels of indexes A3, B3, C3 is any one of evaluation levels (3, 3, 2), (3, 2, 2), (2, 2, 2), the final evaluation level of the fastening state is "2". In this case, at least any one of the axial force, the seating stress, or the axial difference/perpendicularity does not satisfy corresponding recommended criteria, but satisfies corresponding minimum criteria. It is therefore evaluated that the fastening state is roughly appropriate.

In a case where at least any one of the evaluation levels of indexes A3, B3, C3 is "1", the final evaluation level of the fastening state is "1". In this case, any one of the axial force, the seating stress, or the axial difference/perpendicularity does not satisfy corresponding minimum criteria. It is therefore evaluated that the fastening state is inappropriate.

(Evaluation of Seal Material)

A flow up to the above-described calculation of the evaluation level of each of indexes A1, B1 of seal material 23 will be described in detail. First, information processing device 20 calculates a color difference between the measured color value of seal material 23 and the color values of the plurality of candidate seal materials and determines the type of seal material 23 based on the color difference.

FIG. 8 is a diagram showing examples of various databases regarding color differences. FIG. 8(a) shows a table 310 obtained as a result of compiling color differences among a plurality of candidate seal materials of different types (for example, different product numbers) into a database. FIG. 8(b) shows a table 320 obtained as a result of compiling color differences among a plurality of candidate seal materials of the same type into a database. FIG. 8(c) shows a table 330 obtained as a result of adding, to table 310, a color difference between seal material 23 that is an evaluation target (corresponding to a "target object" in FIG. 8(c)) and each candidate seal material. Note that tables 310, 320 are stored in advance in memory 103 of information processing device 20. Such tables 310, 320 may be stored in server 30.

Information processing device 20 creates table 330 by calculating each color difference ΔE based on the color value of seal material 23 acquired from terminal device 40 and the color values of the plurality of candidate seal materials (for example, a seal material with a product number "#600", a seal material with a product number "#700", and a seal material with a product number "#300"). For example, when the color value of seal material 23 is $L_{1*}$, $a_{1*}$, $b_1^*$ and the color value of the candidate seal material is $L_{2*}$, $a_{2*}$, $b_{2*}$, color difference ΔE is expressed by $\Delta E = \{(L_2^* - L_1^*)^2 + (a_2^* - a_1^*)^2 + (b_2^* - b_1^*)^2\}^{1/2}$. Table 330 shows that, for example, a color difference ΔE between seal material 23 and the seal material with the product number "#600" is "4.2".

Information processing device 20 calculates a degree of coincidence between seal material 23 and each of the plurality of candidate seal materials using tables 320, 330. For example, how to calculate a degree of coincidence between seal material 23 and the seal material with the product number "#600" will be described. First, from "4.2" that is the color difference ΔE between seal material 23 and the seal material with the product number "#600", "1.4" that is the largest value of the color difference among the plurality of seal materials with the product number "#600" (hereinafter, also referred to as a "largest color difference") is subtracted (that is, 4.2−1.4=2.8). The value "2.8" obtained with consideration given to color variations among the same types indicates a true color difference between seal material 23 and the seal material with the product number "#600".

Next, the value "2.8" is converted into a percent, and the percent is the degree of coincidence. That is, a degree of coincidence M1 between seal material 23 and the seal material with the product number "#600" is calculated as M1=(1/2.8)*100=35.7%. Likewise, a degree of coincidence M2 between seal material 23 and the seal material with the product number "#700" is calculated as M2={1/(2.2−0.8)}*100=71.4%. A degree of coincidence M3 between seal material 23 and the seal material with the product number "#300" is calculated as M3={1/(18.2−1.1)}*100=5.8%.

Note that the color difference between seal material 23 and the candidate seal material may sometimes make the degree of coincidence calculated by the above-described calculation expression greater than 100%. In this case, a value obtained by subtracting 100% from the degree of coincidence is used as the degree of coincidence between seal material 23 and the candidate seal material.

Information processing device 20 extracts the highest degree of coincidence (that is, 71.4%) from the calculated degrees of coincidence (for example, 35.7%, 71.4%, 5.8%). The "degree of coincidence" described above with reference to FIG. 6 corresponds to the highest degree of coincidence extracted. Information processing device 20 determines that seal material 23 is of the same type as the seal material with the product number "#700" corresponding to the highest degree of coincidence. As described above, in a case where there is a product number corresponding to the highest degree of coincidence of 70% or more, a possibility that seal material 23 is a seal material with the product number (for example, "#700") is extremely high. In this case, it is evaluated that the type of seal material 23 is determined with high accuracy, and the evaluation level of index A1 "type" in FIG. 6 is "3".

Typically, information processing device 20 can determine the type of seal material 23 using the color value of seal material 23 as described above. Note that when the degrees of coincidence (for example, degrees of coincidence M1 to M3) calculated as described above are close to each other, the type of seal material 23 may be determined using the taken image of seal material 23.

Specifically, it is assumed that a difference between the largest value and the smallest value among a predetermined number N (where N is an integer greater than or equal to two) of degrees of coincidence selected in descending order from among the degrees of coincidence is less than a predetermined value K1. In this case, information processing device 20 determines the type of seal material 23 based on a result of collating the taken image of seal material 23 and the taken images of predetermined number N of candidate seal materials corresponding to predetermined number N of degrees of coincidence.

Here, for the sake of simplicity, it is assumed that a degree of coincidence M1 is 75%, a degree of coincidence M2 is 70%, a degree of coincidence M3 is 20%, predetermined number N is 2, and predetermined value K1 is 10%. In this case, a difference (5%) between the largest value (75%) and the smallest value (70%) of two degrees of coincidence M1, M2 selected in descending order from among degrees of coincidence M1 to M3 is less than 10%.

Therefore, information processing device 20 performs processing of collating the taken image of seal material 23, and the taken image of the seal material with the product number "#700" corresponding to degree of coincidence M1 and the taken image of the seal material with the product number "#600" corresponding to degree of coincidence M2 to determine the type of seal material 23.

Figure 9:
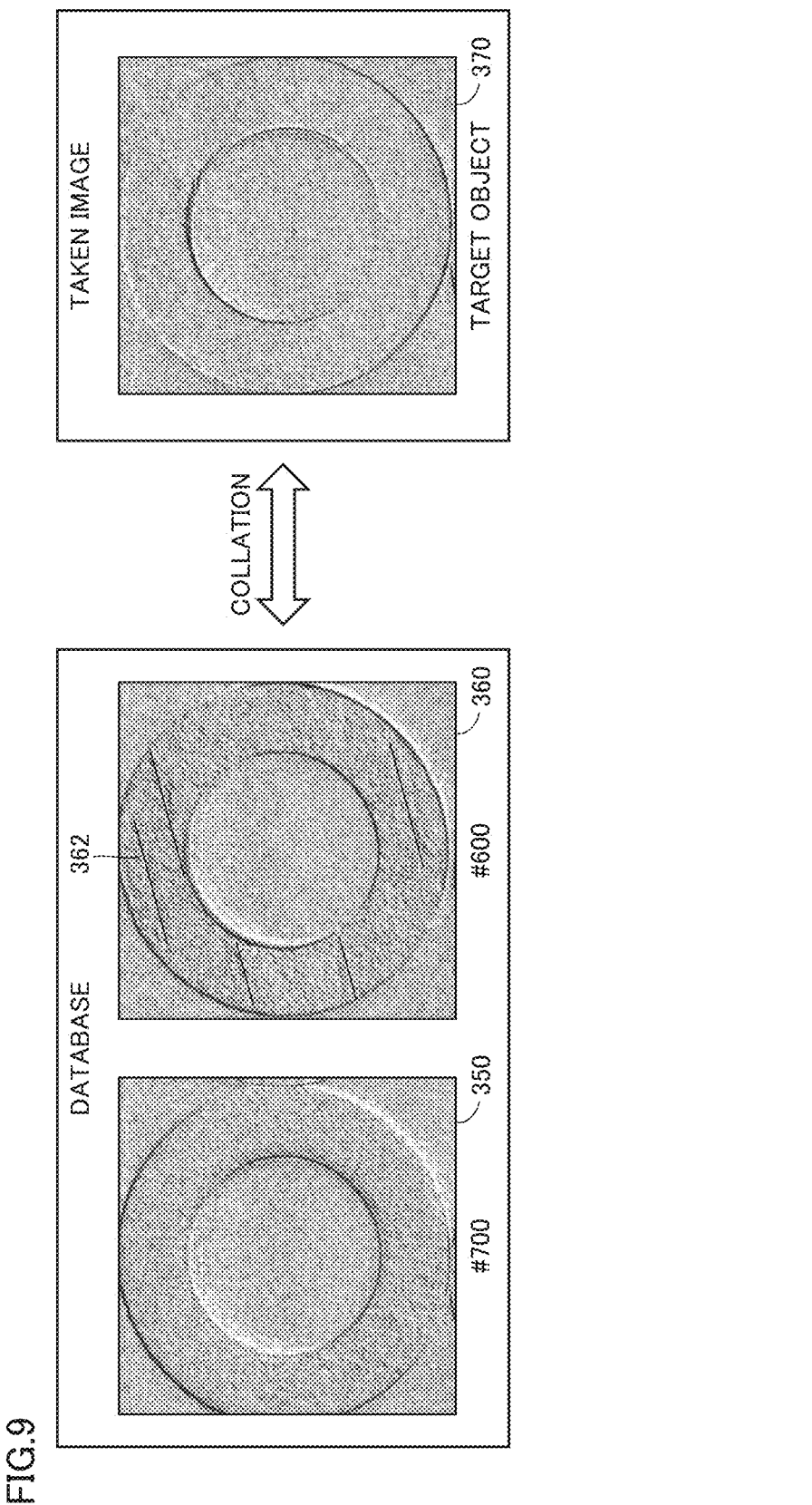
FIG. 9 is a diagram illustrating an example of image collation processing.

FIG. 9 is a diagram illustrating an example of image collation processing. With reference to FIG. 9, information processing device 20 collates a taken image 350 of the seal material with the product number "#700" and a taken image 370 of seal material 23, and collates a taken image 360 of the seal material with the product number "#600" and taken image 370 of seal material 23.

Due to a difference in manufacturing method, taken image 360 of the seal material with the product number "#600" contains a linear pattern 362, but taken image 350 of the seal material with the product number "#700" and taken image 370 of seal material 23 contain no linear pattern 362. Therefore, information processing device 20 determines that taken image 350 is more similar to taken image 370 than taken image 360, and determines that seal material 23 is of the same type as the seal material with the product number "#700" corresponding to taken image 350.

Note that, to the collation of the image of seal material 23 and the image of the candidate seal material (in this case, the seal materials with the product numbers "#600", "#700"), known image processing may be applied. Examples of the image processing include processing of segmenting the image of seal material 23 and the image of the candidate seal material into a plurality of regions and comparing features of the regions.

After determining the type of seal material 23 as described above, information processing device 20 reads out the recommended use environment associated with the type from the internal memory (memory 103). According to the above-described example, since seal material 23 is determined to be the seal material with the product number "#700", the recommended use environment of the product number "#700" is read out. Then, information processing device 20 compares the use environment of seal material 23 received from terminal device 40 with the recommended use environment of the product number "#700". In a case where the use environments coincide with each other, the evaluation level of index B1 is "3", and in a case where the use environments do not coincide with each other, the evaluation level of index B1 is "1".

Information processing device 20 calculates the evaluation levels of indexes A1, B1 as described above and calculates the final evaluation level of seal material 23 based on each evaluation level and table 710 of FIG. 7.
(Evaluation of Flange)

A flow up to the above-described calculation of the evaluation level of each of indexes A2, B2 of flange 24 will be described in detail. First, information processing device 20 analyzes the taken image of the seal surface of flange 24 to obtain the above-described area ratio, and determines whether or not an adhering matter exists on the seal surface.

Figure 10:
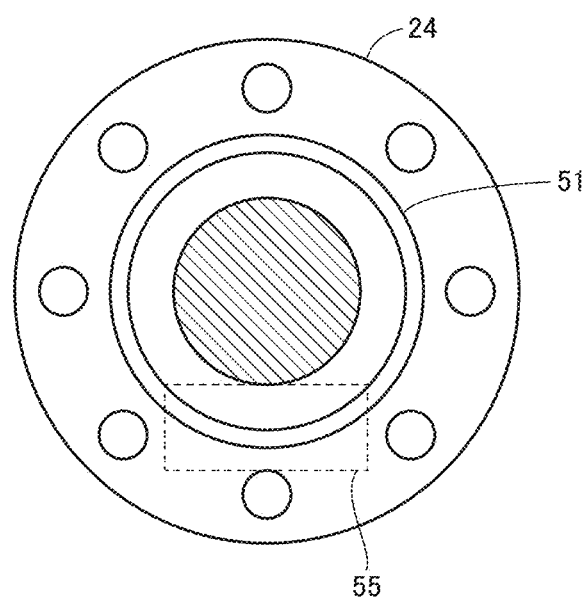
FIG. 10 is a diagram for describing an imaging region of a flange.

FIG. 10 is a diagram for describing an imaging region of flange 24. With reference to FIG. 10, an imaging region 55 of flange 24 is set as a region including a fastening portion 51 on the seal surface of flange 24. Fastening portion 51 is a portion where seal material 23 is disposed. Camera 22 takes an image of the seal surface including imaging region 55 of flange 24.

FIG. 11 is a diagram for describing a method for calculating an area ratio. FIG. 11(a) is a diagram illustrating an analysis example in a case where no adhering matter exists on flange 24. FIG. 11(b) is a diagram illustrating an analysis example in a case where an adhering matter exists on flange 24.

With reference to FIG. 11(a), an image 610 is a taken image of imaging region 55. A region surrounded by a line 612 and a line 614 is defined as an analysis region 618. An image 616 is obtained as a result of highlighting analysis region 618 by image analysis. With reference to FIG. 11(b), an image 620 is a taken image of imaging region 55, and a region surrounded by a line 622 and a line 624 is defined as an analysis region 628. An image 626 is obtained as a result of highlighting analysis region 628 by image analysis. Note that image 626 includes a white region 630.

A comparison between image 616 and image 626 shows that there is no white region in image 616, but there is white region 630 in image 626. Specifically, white region 630 indicates a region where an adhering matter exists on the seal surface of flange 24. Here, the area ratio is a ratio of the area of the adhering matter to the area of the analysis region on the seal surface of flange 24. Therefore, in a case of FIG. 11(a), since there is no white region, the area ratio is 0%. On the other hand, in a case of FIG. 11(b), the area ratio is a ratio of the area of white region 630 to the area of analysis region 628 and is about 80%.

In a case of flange 24 in FIG. 11(a), since the area ratio is less than 10%, the evaluation level of index A2 in FIG. 6 is "3". In a case of flange 24 of FIG. 11(b), since the area ratio is greater than or equal to 50%, the evaluation level of index A2 is "1".

Further, information processing device 20 calculates the evaluation level of index B2 by comparing measured flatness Df with the individual evaluation criteria in FIG. 6. For example, in a case where flatness Df is $\frac{1}{300}$ mm, the recommended criteria of less than $\frac{1}{250}$ mm are satisfied, so that the evaluation level of index B2 is "3".

Information processing device 20 calculates the evaluation levels of indexes A2, B2 as described above and calculates the final evaluation level of flange 24 based on each evaluation level and table 720 of FIG. 7.
(Evaluation of Fastening State)

Information processing device 20 calculates the evaluation level of index A3 by comparing the measured axial force with the individual evaluation criteria of index A3 in FIG. 6. For example, in a case where the measured axial force falls within ±5% of the recommended axial force, the evaluation level of index A3 is "3". Similarly, information processing device 20 calculates the evaluation level of index B3 by comparing the measured seating stress with the individual evaluation criteria of index B3 in FIG. 6. For example, in a case where the measured seating stress falls within ±5% of the recommended seating stress, the evaluation level of index B3 is "3". Similarly, information processing device 20 calculates the evaluation level of index C3 by comparing the measured axial difference and the measured perpendicularity with the individual evaluation criteria of index C3 in FIG. 6. For example, in a case where the measured axial difference is less than 1.5 mm and the measured perpendicularity is less than 0.8 mm, the evaluation level of index C3 is "3".

Information processing device 20 calculates the evaluation levels of indexes A3, B3, C3 as described above and calculates the final evaluation level of the fastening state based on each evaluation level and table 730 of FIG. 7.
<Output of Advice Information>

FIG. 12 is a diagram showing output examples of advice information. With reference to FIG. 12, a table 800 shows output examples of advice information each associated with a corresponding final evaluation level. Specifically, information processing device 20 outputs advice information on the fastening of flange 24 using seal material 23 based on the evaluation result (for example, the final evaluation level) of seal material 23, the final evaluation level of flange 24, and the final evaluation level of the fastening state. The advice information includes an overall evaluation result ("most appropriate", "appropriate", or the like in FIG. 12) based on each evaluation result and a remedial measure.

In a case where all the three final evaluation levels are "3" (in a case of a row R1 of table 800), the overall evaluation result is "most appropriate". This indicates that there is no problem in fastening of flange 24 using seal material 23.

In a case where two final evaluation levels are "3" and one final evaluation level is "2", the overall evaluation result is "appropriate". This indicates that the evaluation target corresponding to the final evaluation level "2" does not satisfy the recommended criteria, but the fastening of flange 24 using seal material 23 has almost no problem as a whole. In this case, additional information on the evaluation target corresponding to the final evaluation level "2" is output.

For example, when both the final evaluation levels of seal material 23 and flange 24 are "3" and the final evaluation level of the fastening state is "2" (in a case of a row R2 of table 800), additional information on the fastening state (for example, a fastening method, and a refastening frequency) is output together with the overall evaluation result "appropriate". In a case of a row R3, additional information on the flange (for example, a flange inspection correction method, a replacement frequency, and a recommended model number) is output. In a case of a row R8, additional information on the seal material (for example, a recommended product number of the seal material and a paste application method) is output.

In a case where one final evaluation level is "3" and two final evaluation levels are "2", the overall evaluation result is "fair". Even in a case where the three final evaluation levels are "2", the overall evaluation result is "fair". This indicates that the evaluation target corresponding to the final evaluation level "2" does not satisfy the recommended criteria, but the fastening of flange 24 using seal material 23 satisfies the minimum criteria as a whole. In this case, recommendation information on the evaluation target corresponding to the final evaluation level "2" is output.

For example, in a case where the final evaluation level of seal material 23 is "3" and both the final evaluation levels of flange 24 and the fastening state are "2" (in a case of a row R4 of table 800), recommendation information on each of the flange and the fastening state is output together with the overall evaluation result "fair". Further, in a case where all the final evaluation levels of seal material 23, flange 24, and the fastening state are "2" (in a case of a row R11 of table 800), recommendation information on each of the seal material, the flange, and the fastening state is output together with the overall evaluation result "fair".

Next, in a case where the final evaluation level of seal material 23 is "2" or "3", and either of the final evaluation levels of flange 24 and the fastening state is "1", the overall evaluation result is "poor". This indicates that the evaluation target corresponding to the final evaluation level "1" does not satisfy the minimum criteria. In this case, information for prompting rechecking of the evaluation target corresponding to the final evaluation level "1" is output. Note that information for assisting in the rechecking may be output.

For example, in a case where the final evaluation level of the fastening state is "1" and both the final evaluation levels of seal material 23 and flange 24 are "3" (in a case of a row R5 of table 800), information for prompting rechecking of the fastening state is output together with the overall evaluation result "poor". Further, information for assisting the worker in rechecking the fastening state (for example, recommended criteria of the axial force, the seating stress, the perpendicularity, the axial difference, and the like) may be output. As another example, in a case where the final evaluation level of flange 24 is "1" and both the final evaluation levels of seal material 23 and the fastening state are "3" (in a case of a row R6 of table 800), information for prompting rechecking of the state of flange 24 is output together with the overall evaluation result "poor". Further, information for assisting the worker in rechecking (for example, an image of the flange in an appropriate state, recommended criteria of flatness, and the like) may be output.

Next, in a case where the final evaluation level of seal material 23 is "1" (in a case of a row R15 of table 800 or the like), the overall evaluation result is "not workable". This indicates that seal material 23 itself is a defective product or seal material 23 that does not satisfy the use environment is used, so that work using seal material 23 itself is impossible in the first place. In this case, information for prompting rechecking (or replacement) of seal material 23 is output together with the overall evaluation result "not workable".

Note that information processing device 20 may be configured to further output a detailed evaluation result for the evaluation target corresponding to the final evaluation level "2" or "1" as the advice information. For example, in a case where the final evaluation level of seal material 23 is "1" or "2", the evaluation result regarding indexes A1, B1 (see FIG. 6) of seal material 23 may be output. In this case, for example, regarding index A1, an evaluation result indicating that the type of seal material 23 cannot be determined (or can be determined but with low accuracy) is output, and regarding index B 1, an evaluation result indicating that the use environment of seal material 23 does not satisfy the recommended use environment is output.

In a case where the final evaluation level of flange 24 is "1" or "2", the evaluation result regarding indexes A2, B2 (see FIG. 6) of flange 24 may be output. For example, regarding index A2, an evaluation result indicating that an adhering matter exists on flange 24 is output. Regarding index B2, an evaluation result indicating that the flatness of flange 24 does not satisfy the recommended criteria (or the minimum criteria) is output.

In a case where the final evaluation level of the fastening state is "1" or "2", the evaluation results regarding indexes A3, B3, C3 (see FIG. 6) of the fastening state may be output. For example, regarding index A3, an evaluation result indicating that the axial force does not satisfy the recommended criteria (or minimum criteria) is output. Regarding index B3, an evaluation result indicating that the seating stress does not satisfy the recommended criteria (or minimum criteria) is output. Regarding index C3, an evaluation result indicating that the axial difference/perpendicularity does not satisfy the recommended criteria (or minimum criteria) is output.

<Functional Configuration>

Figure 13:
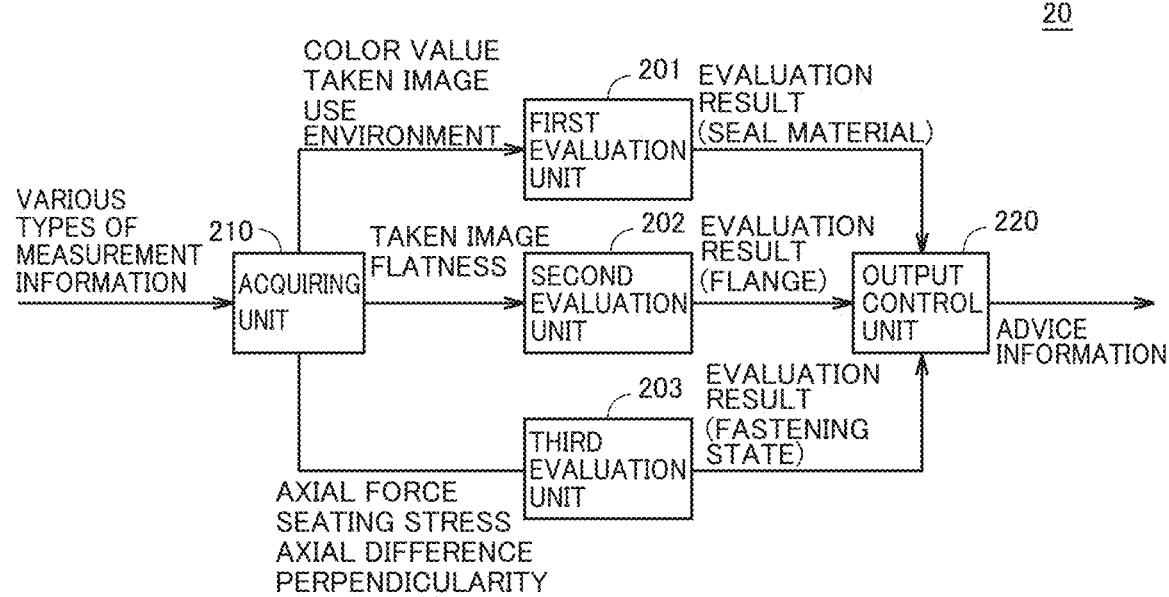
FIG. 13 is a block diagram illustrating an example of a functional configuration of the information processing device.

FIG. 13 is a block diagram illustrating an example of a functional configuration of information processing device 20. With reference to FIG. 13, information processing device 20 includes a first evaluation unit 201, a second evaluation unit 202, a third evaluation unit 203, an acquiring unit 210, and an output control unit 220 as main functional components. Functions of such components are each implemented, for example, via the program executed by processor 101 of information processing device 20, the program being stored in memory 103. Note that some or all of the functions may be implemented via hardware.

Acquiring unit 210 acquires (receives) various types of measurement information from terminal device 40 via communication interface 111. Specifically, acquiring unit 210 receives information indicating the color value, the taken image, and the use environment (for example, use fluid, use temperature, and use pressure) of seal material 23 as the measurement information on seal material 23. Acquiring unit 210 receives the taken image and the flatness of flange 24 as the measurement information on flange 24. Acquiring unit 210 receives the axial force, the seating stress, the axial difference, and the perpendicularity as the measurement information on the fastening state.

First evaluation unit 201 evaluates seal material 23 based on the measurement information on seal material 23. In one aspect, first evaluation unit 201 determines the type of seal material 23 based on the color value of seal material 23. Specifically, first evaluation unit 201 calculates the color difference between each of the plurality of candidate seal materials and seal material 23 based on the color value of seal material 23 and the color value of the candidate seal material. Memory 103 stores the color value of each of the plurality of candidate seal materials of different types (for example, the product numbers "#600", "#700", "#300", and the like).

First evaluation unit 201 calculates the degree of coincidence between each candidate seal material and seal material 23 based on the color difference between the candidate seal material and seal material 23. More specifically, first evaluation unit 201 calculates, for each of the plurality of candidate seal materials, the degree of coincidence between the candidate seal material and seal material 23 based on the color difference between the candidate seal material and seal material 23 and the largest color difference among the candidate seal materials. Memory 103 stores, for each type of the plurality of candidate seal materials, the largest color difference (for example, stores table 320) among the candidate seal materials of the same type (for example, among the seal materials with the product number "#600"). Then, first evaluation unit 201 determines the type of seal material 23 based on each degree of coincidence thus calculated. For example, first evaluation unit 201 determines that seal material 23 is of the same type as the candidate seal material corresponding to the highest degree of coincidence among the degrees of coincidence. Note that first evaluation unit 201 calculates the evaluation level of index A1 in accordance with table 510 (see FIG. 6) and the value of the highest degree of coincidence. Note that, as described above, in a case where the calculated degree of coincidences are close in value to each other, first evaluation unit 201 may determine the type of seal material 23 based on a comparison result between the taken image of seal material 23 and taken images of predetermined number N of candidate seal materials corresponding to predetermined number N of degrees of coincidence.

In another aspect, first evaluation unit 201 compares the information indicating the use environment of seal material 23 with the information indicating the recommended use environment of the seal material of the type thus determined to evaluate whether or not the use environment of seal material 23 is appropriate. Specifically, in a case where the information indicating the use environment of seal material 23 coincides with the information indicating the recommended use environment, first evaluation unit 201 evaluates that the use environment of seal material 23 is appropriate (for example, calculates the evaluation level "3" of index B1), and otherwise, evaluates that the use environment of seal material 23 is not appropriate (calculates the evaluation level "1" of index B1).

First evaluation unit 201 outputs the final evaluation result (for example, the final evaluation level shown in table 710 of FIG. 7) of seal material 23 to output control unit 220 based on the accuracy of determination of the type of seal material 23 (for example, the evaluation result of index A1) and whether or not the use environment of seal material 23 is appropriate (for example, the evaluation result of index B1).

Second evaluation unit 202 evaluates, based on the taken image of flange 24 before being fastened using seal material 23, the state of flange 24 before being fastened. In one aspect, second evaluation unit 202 calculates the ratio of the area occupied by an adhering matter adhering to flange 24 (for example, white region 630) to the analysis region (for example, analysis regions 618, 628) of the taken image (for example, images 610, 620). In a case where the area ratio is less than a threshold Th1 (for example, 10%), second evaluation unit 202 evaluates that almost no adhering matter exists on the seal surface of flange 24 (for example, calculates the evaluation level "3" of index A2).

In another aspect, in a case where the flatness of flange 24 is less than a threshold Th2 (for example, 1/250 mm), second evaluation unit 202 evaluates that the flatness of flange 24 satisfies the recommended criteria (for example, calculates the evaluation level "3" of index B2).

Second evaluation unit 202 outputs the final evaluation result (for example, the final evaluation level shown in table 720 of FIG. 7) of flange 24 to output control unit 220 based on whether or not an adhering matter exists on flange 24 (for example, the evaluation result of index A2) and the evaluation result of the flatness of flange 24 (for example, the evaluation result of index B2).

Typically, in a case where the area ratio is less than threshold Th1 and the flatness of flange 24 is less than threshold Th2, second evaluation unit 202 evaluates that the state of flange 24 is appropriate (calculates the final evaluation level "3"). Note that the state of flange 24 may be evaluated only with index A2. In this case, in a case where the area ratio is less than threshold Th1, second evaluation unit 202 may evaluate that the state of flange 24 is appropriate.

Third evaluation unit 203 evaluates the fastening state of the pair of flanges 24 with seal material 23 interposed between flanges 24 based on a predetermined condition regarding the fastening of flange 24. Specifically, in a case where a parameter regarding the fastening state of the pair of flanges 24 with seal material 23 interposed between flanges 24 satisfies the predetermined condition, third evaluation unit 203 evaluates that the fastening state of the pair of flanges 24 is appropriate. The parameter includes at least one of the axial force, the seating stress, the axial difference, or the perpendicularity. The satisfaction of the predetermined condition includes, for example, that each parameter (for example, the axial force, the seating stress, the axial difference, and the perpendicularity) satisfies the recommended criteria (for example, all the evaluation levels of indexes A3, B3, C3 are "3"). Note that, in the description given with reference to FIG. 6, the configuration where index A3 is a combination of the axial difference and the perpendicularity has been described, but the present disclosure is not limited to such a configuration. A configuration where the axial difference and the perpendicularity are each evaluated as an individual index may be employed.

Third evaluation unit 203 outputs the final evaluation result (for example, the final evaluation level shown in table 730 of FIG. 7) of the fastening state to output control unit 220 based on the evaluation result of each parameter (for example, the evaluation results of indexes A3, B3, C3).

Output control unit 220 outputs advice information on the fastening of flange 24 using seal material 23 based on the respective evaluation results of first evaluation unit 201, second evaluation unit 202, and third evaluation unit 203. The advice information includes the overall evaluation result (for example, an overall evaluation result such as "most appropriate" or "appropriate" of table 800 of FIG. 12) based on each evaluation result, and the information for prompting checking of the evaluation target (for example, seal material 23) of each of first evaluation unit 201, second evaluation unit 202, and third evaluation unit 203 in a case where the evaluation unit (for example, first evaluation unit 201) has made a negative evaluation (for example, the final evaluation level is "1"). Further, the advice information may further include information ("remedial measure" in table 800) for improvement to change the negative evaluation made by the evaluation unit to a positive evaluation (for example, the final evaluation level is "3").

Output control unit 220 transmits the advice information to terminal device 40. Note that output control unit 220 may transmit the advice information to server 30. Alternatively, output control unit 220 may display the advice information on display 105.

<Advantages>

According to the present embodiment, it is possible to quickly present effective advice information on fastening of a flange using a seal material. It is therefore possible for even a person who is not an expert to appropriately fasten the flange in accordance with the advice information. Further, it is possible to quickly handle trouble related to the use of the seal material or the fastening of the flange.

<Other Embodiment>

(1) In the above-described embodiment, the configuration where information processing device 20 receives various types of measurement information from terminal device 40 has been described, but the present disclosure is not limited to such a configuration. Information processing device 20 itself may acquire the various types of measurement information.

(2) In the above-described embodiment, it is also possible to provide a program for enabling a computer to execute the control as described in the above-described flowchart. Such a program can also be provided as a program product by being recorded on a non-transitory computer-readable recording medium such as a flexible disk, a compact disc read only memory (CD-ROM), a secondary storage device, a primary storage device, or a memory card attached to the computer. Alternatively, the program can be provided by being recorded on a recording medium such as a hard disk built in the computer. Further, the program can be provided by being downloaded over a network.

The program may be a program that calls a necessary module in a predetermined sequence at a predetermined timing from among program modules provided as a part of an operating system (OS) of the computer to perform processing. In this case, the program itself does not include the modules, and the processing is performed in cooperation with the OS. A program having no such modules may also be included in the program according to the present embodiment. Further, the program according to the present embodiment may be provided by being incorporated into a part of the other program. In this case as well, the program itself does not include modules included in the other program, and the processing is performed in cooperation with the other program. A program incorporated into the other program may also be included in the program according to the present embodiment.

(3) Each of the configurations exemplified as the above-described embodiment is an example of the configuration of the present disclosure, and may be combined with another known technique, or may be modified, for example, partially omitted, without departing from the gist of the present disclosure. Further, in the above-described embodiments, the processing and configuration described in the other embodiment may be employed and implemented as needed.

It should be understood that the embodiments disclosed herein are illustrative in all respects and not restrictive. The scope of the present disclosure is defined by the claims rather than the above description, and the present disclosure is intended to include the claims, equivalents of the claims, and all modifications within the scope.

REFERENCE SIGNS LIST

12: bolt, 14: nut, 20: information processing device, 21: color difference meter, 22: camera, 23: seal material, 24: flange, 30: server, 40: terminal device, 51: fastening portion, 55: imaging region, 101: processor, 103: memory, 105: display, 107: input device, 109: input/output interface, 111: communication interface, 201: first evaluation unit, 202: second evaluation unit, 203: third evaluation unit, 210: acquiring unit, 220: output control unit, 1000: information processing system

The invention claimed is:

1. An information processing device comprising:
a first evaluation unit that determines a type of a target seal material based on a color value of the target seal material and a color value of each of a plurality of candidate seal materials;
a second evaluation unit that evaluates, based on a taken image of a flange before being fastened using the target seal material, a state of the flange before being fastened;
a third evaluation unit that evaluates a fastening state of a pair of the flanges with the target seal material interposed between the flanges based on a predetermined condition regarding fastening of the flange; and
an output control unit that outputs advice information on the fastening of the flange using the target seal material based on respective evaluation results of the first to third evaluation units.

2. The information processing device according to claim 1, wherein
the first evaluation unit
calculates, based on the color value of the target seal material and the color value of each of the plurality of candidate seal materials, a color difference between each of the candidate seal materials and the target seal material, and
determines the type of the target seal material based on the color difference between each of the candidate seal materials and the target seal material.

3. The information processing device according to claim 2, wherein the first evaluation unit compares information indicating a use environment of the target seal material with information indicating a recommended use environment of a seal material of the determined type to evaluate whether or not the use environment of the target seal material is appropriate.

4. The information processing device according to claim 1, wherein
the second evaluation unit
calculates a ratio of an area occupied by an adhering matter adhering to the flange to an analysis region of the taken image, and
evaluates, in a case where the ratio is less than a first threshold, that the state of the flange is appropriate.

5. The information processing device according to claim 1, wherein
the second evaluation unit
calculates a ratio of an area occupied by an adhering matter adhering to the flange to an analysis region of the taken image, and
evaluates, in a case where the ratio is less than a first threshold and flatness of the flange is less than a second threshold, that the state of the flange is appropriate.

6. The information processing device according to claim 1, wherein the third evaluation unit evaluates, in a case where a parameter regarding the fastening state of the pair of flanges with the target seal material interposed between the flanges satisfies the predetermined condition, that the fastening state of the pair of flanges is appropriate.

7. The information processing device according to claim 6, wherein the parameter includes at least one of an axial force of a bolt with which the pair of flanges are fastened, a seating stress applied to the target seal material when the pair of flanges are fastened, an axial difference between the pair of flanges, or perpendicularity of the pair of flanges.

8. The information processing device according to claim 1, wherein the advice information includes an overall evaluation result based on the respective evaluation results of the first to third evaluation units, and information for prompting checking, for each of the first to third evaluation units, of an evaluation target of the evaluation unit in a case where the evaluation unit has made a negative evaluation.

9. The information processing device according to claim 8, wherein the advice information further includes information for improvement, for each of the first to third evaluation units, to change a negative evaluation to a positive evaluation in a case where the evaluation unit has made the negative evaluation.

* * * * *